United States Patent [19]
Ohishi

[11] Patent Number: 5,389,997
[45] Date of Patent: Feb. 14, 1995

[54] APPARATUS FOR CORRECTING CAMERA SHAKE

[75] Inventor: Sueyuki Ohishi, Tokyo, Japan

[73] Assignee: Nikon Corporation, Tokyo, Japan

[21] Appl. No.: 113,770

[22] Filed: Aug. 31, 1993

[30] Foreign Application Priority Data

Sep. 4, 1992 [JP] Japan .................. 4-263056

[51] Int. Cl.$^6$ .................. G03B 29/00; G03B 5/00
[52] U.S. Cl. .................. 354/430; 354/202
[58] Field of Search .................. 354/430, 202, 70; 358/222

[56] References Cited

U.S. PATENT DOCUMENTS

| | | | |
|---|---|---|---|
| 4,864,409 | 9/1989 | Platte et al. | 358/222 |
| 4,970,540 | 11/1990 | Vasey et al. | 354/202 |
| 5,130,729 | 7/1992 | Sato et al. | 354/202 |
| 5,155,520 | 10/1992 | Nagasaki et al. | 354/430 |

Primary Examiner—Howard B. Blankenship
Assistant Examiner—Jae N. Noh
Attorney, Agent, or Firm—Shapiro and Shapiro

[57] ABSTRACT

An apparatus for correcting camera shake due to movement of the hands comprises: a correction unit for correcting for the movement of the hands; a drive unit for driving the correction unit; a control device for controlling the drive unit; a movement detection unit for detecting the amount of the movement of the hands and generating an output corresponding to the detected amount of the movement; and a speed calculating unit for calculating the target driving speed of the correction unit on the basis of the output of the movement detection unit. The control unit controls the drive unit so that the drive unit intermittently drives the correction unit if the target driving speed calculated by the speed calculating unit is smaller than a predetermined value.

20 Claims, 7 Drawing Sheets

APPARATUS FOR CORRECTING CAMERA SHAKE

BACKGROUND OF THE INVENTION

1. Field of the Invention

The present invention relates to an apparatus for correcting a camera shake.

2. Related Background Art

In a conventional camera, the angular velocity of a camera which is being inclined by an unintentional hand movement is detected, for example, by an angular velocity sensor. Blur in the object image caused by the camera shake is corrected by moving a correcting lens by a motor, and the like, at a speed in accordance with the angular velocity in a direction orthogonal with respect to the optical axis so that the movement of hands is canceled.

In such a camera the position of the correcting lens is detected, for example, by counting pulses output from interrupters. The motor for driving the correcting lens is controlled with a negative feedback according to the position of the correcting lens, thereby controlling the rotating speed of the motor, that is, the moving speed of the correcting lens.

The coefficient of static friction of the motor and machine parts for converting rotary motion of the motor into linear motion and transmitting it to the correcting lens is greater than the coefficient of dynamic friction thereof. Thus, higher voltage has to be applied to the motor in order to give greater force (greater acceleration) to the correcting lens when the correcting lens at rest is to be started moving than when it is already moving.

More specifically, suppose that turning on/off the motor (power applying time in a predetermined cycle) is controlled according to a PWM (Pulse Width Modulation) wave. When the motor and the correction lens at rest are to be started moving, the duty of the PWM wave is increased from 0%.

The duty of the PWM wave is defined as $$(T/Tmax) \times 100 \, (\%)$$

wherein T is the current ON pulse duration of the PWM wave, and Tmax is the maximum ON pulse duration of the PWM wave.

Figure 3:
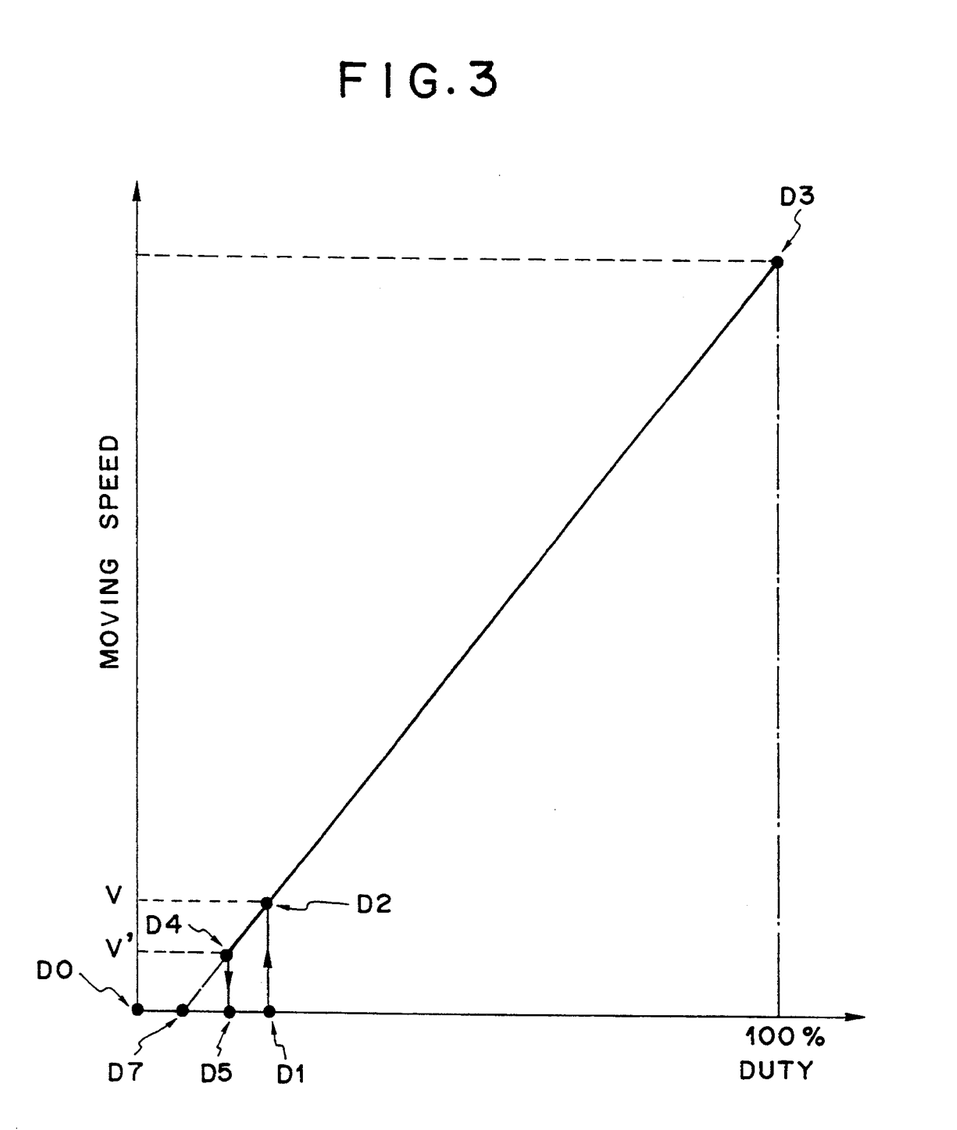
FIG. 3 is a graph showing the relation between the duty of the PWM wave and the moving speed of the correcting lens of a conventional camera when rotation of the motor is in the stable state.

In this case, however, even when the duty of the PWM wave is increased from 0%, the motor and the correcting lens do not start at once, because of the static friction of the motor and the machine parts. This is illustrated in FIG. 3, which shows the relation between the duty of the PWM wave and the moving speed of the correcting lens when rotation of the motor is in the steady state. As the duty of the PWM wave is increased from 0% (DO), the motor and the correcting lens at rest start to move at the time (D1) when the duty of the PWM wave reaches a certain value. Then, the moving speed of the correcting lens suddenly increases from 0 to a predetermined velocity V (D2).

After that, as the duty of the PWM wave is increased, the moving speed of the correcting lens is also increased. And when the duty of the PWM wave becomes 100%, the moving speed of the correcting lens reaches its maximum.

When the duty of the PWM wave is decreased from 100%, the moving speed of the correcting lens is also decreased. However, because the dynamic frictional force is smaller than the static frictional as described earlier, the correcting lens does not stop moving even when its moving speed is decreased to be equal to the velocity V at which the correcting lens starts moving. Only when the duty of the PWM wave is further decreased and the moving speed of the correcting lens comes to be equal to a velocity V' (D4) which is smaller than the velocity V, the correcting lens stops moving (D5).

As described above, when at first the duty of the PWM wave is increased from 0% to start the motor and the correcting lens moving, and then the duty of the PWM wave is decreased to stop the motor and the correction lens, the moving speed of the correcting lens changes in the following sequence:

$$D0 \rightarrow D1 \rightarrow D2 \rightarrow D3 \rightarrow D4 \rightarrow D5 \rightarrow D0$$

(see FIG. 3)

Accordingly, in the range from D4 to D7 (indicated by the dashed line in FIG. 3), that is, at a low speed, the movement of the correcting lens can not be controlled and the camera shake in taking pictures can not be corrected.

Further, in the range from D2 to D4, although the moving speed of the correcting lens can be controlled by varying the duty of the PWM wave if the motor and the correcting lens are moving, the moving speed of the correcting lens can not be controlled even by varying the duty of the PWM wave if the motor and the correcting lens are at rest, because in this case, the correcting lens won't be started moving.

In addition, in this kind of camera, whether the motor and the correcting lens are in motion or at rest is judged according to whether said interrupters have output a pulse within a last predetermined time lapse, for example several tens of milliseconds, or not. On the other hand, correction of the camera shake executed by controlling the moving speed of the correcting lens is a real-time operation.

Accordingly there is little time to control the moving speed of the correcting lens in the range from D2 to D4 if the correction is executed only after judging the motor and the correcting lens to be in motion.

SUMMARY OF THE INVENTION

The present invention was made in consideration of said circumstances. An object of the present invention is to provide an apparatus for correcting the unintentional camera shake in taking pictures and which can control the correcting lens at a low speed and reduce an error of correction of a camera shake.

An apparatus according to one aspect of the present invention comprises: a correcting lens serving as correcting means for correcting the camera shake; a motor serving as driving means for driving the correcting lens; a motor drive circuit serving as control means for controlling the motor; and an angular velocity detection circuit serving as detection means for detecting the camera shake, wherein processing operations of this correcting apparatus include a step of calculating a target driving speed of the correcting lens on the basis of the camera shake detected by and output from the angular velocity detection circuit, and the motor drive circuit intermittently drives the motor according to the target driving speed calculated in said step.

An apparatus according to the present invention may also comprises a lens position detection circuit serving as position detection means for detecting the current position of the correcting lens, and processing operations may further include: a step of calculating a target position of the correcting lens on the basis of the calculated target driving speed calculated and a step of calculating the difference between the target position of the correcting lens and the current position of the correcting lens detected by said lens position detection circuit, wherein the motor drive circuit intermittently drives the motor according to said calculated difference as well as said calculated target driving speed.

An apparatus according to the present invention may be characterized in that the lens position detection circuit is provided with an interrupter.

In the apparatus for correcting camera shake constructed as described above, the target driving speed of the correcting lens is calculated on the basis of the amount of camera shake detected by the angular velocity detection circuit, and the target position is calculated on the basis of the resultant target driving speed. The current position of the correcting lens is detected to calculate the difference between the target position of the correcting lens and the current position of the correcting lens, and the motor drive circuit intermittently drives the motor according to the target driving speed of the correcting lens or according to the difference between the target position of the correcting lens and the current position of the correcting lens. Therefore, a stable speed control can be performed not only when the motor drives the correcting lens at a medium or high speed but also at a low speed, and the error of correction of the camera shake by the correcting lens can be reduced.

DESCRIPTION OF THE PREFERRED EMBODIMENTS

Figure 1:
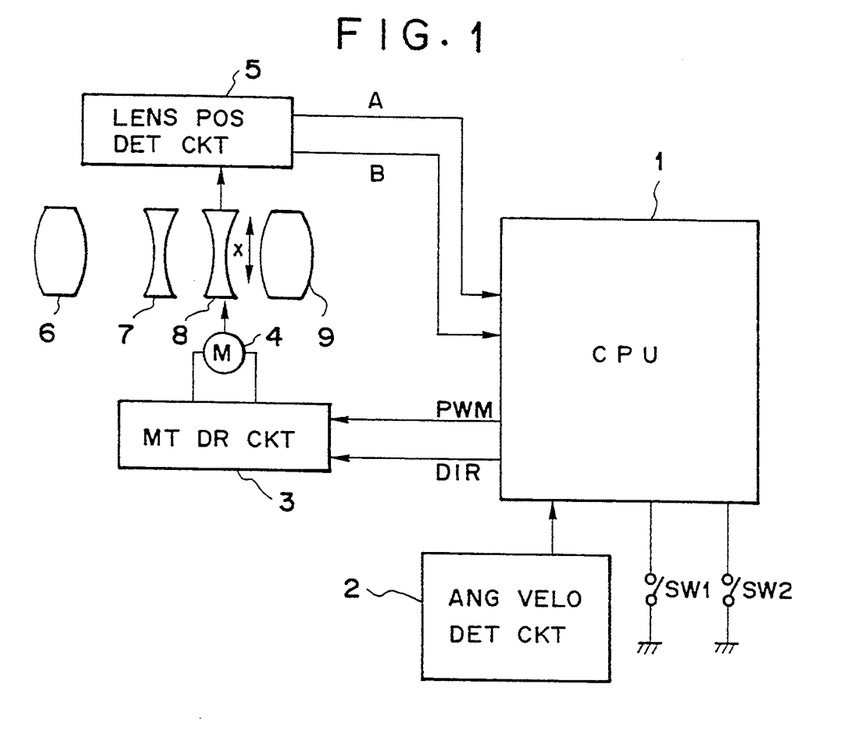
FIG. 1 is a block diagram showing constitution of an embodiment of a camera to which the apparatus according to the present invention for correcting the camera shake is applied.

FIG. 1 is a block diagram showing the constitution of an embodiment of a camera to which the apparatus according to the present invention for correcting the camera shake is applied. When a main switch SW1 of the camera is turned on, a CPU 1 starts its operations. The CPU applies a direction pulse serving as a control signal for controlling the direction of rotation of a motor 4 and a PWM pulse serving as a control signal for controlling the rotating speed of the motor 4 to a motor drive circuit 3 according to the output of an angular velocity detection circuit 2 (which indicates the angular velocity at which the camera is moved by the unintentional camera shake, and the like) or the output of a lens position detection circuit 5 (either a pulse A or a pulse B, which will be described later).

When a release switch SW2 is turned on, the CPU 1 drives a shutter (not shown) in order to expose a film (not shown) to light from an object: is incident on a photographing lens 6, and passes through a focusing lens 7 which shifts in the direction of the optical axis to perform the focusing operation, a correcting lens 8 which shifts in the direction perpendicular to the optical axis (that is, in a plane including the arrow X in FIG. 1 and perpendicular to the page space) to correct the camera shake, and a photographing lens 9, finally reaching the film.

The release switch SW2 is turned on when a release button (not shown) is fully pushed. The angular velocity detection circuit 2 detects the angular velocity at which the camera is moved by the camera shake, A/D converts the detected result and applies it to the CPU 1. Incidentally, the angular velocity detection circuit can be replaced by another circuit such as a circuit for detecting the velocity at which the camera is moved by the camera shake.

Figure 2:
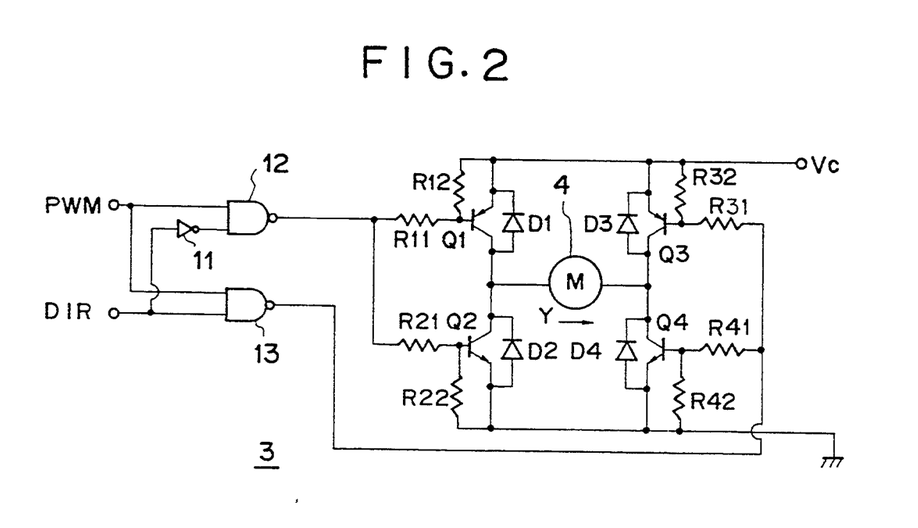
FIG. 2 is a more detailed diagram showing the constitution of the motor drive circuit of the embodiment shown in FIG. 1.

The motor drive circuit 3 has a constitution, for example, as shown in FIG. 2, and drives the motor 4 according to the direction pulse and the PWM pulse output from the CPU 1.

More, specifically, the PWM pulse is applied to a NAND gate 12 via one of its input terminal, while the direction pulse is applied through a NOT gate 11 to the NAND gate via the other input terminal. The PWM pulse is applied to a NAND gate 13 via one of its input terminals, while the direction pulse is applied to the, NAND gate 13 via the other input terminal.

The output terminal of the NAND gate 12 is connected through a resistance $R_{11}$ with the base of a a PNP transistor Q1, and one end of a resistance $R_{12}$ is connected with the connection point of the resistance $R_{11}$ and the PNP transistor Q1. The other end of the resistance $R_{12}$ is connected with the emitter of the PNP transistor Q1, and the connection point thereof is connected with the cathode of a diode $D_1$ as well as with a power source $V_C$. The anode of the diode $D_1$ is connected with the collector of the PNP transistor Q1, and the connection point thereof is connected with the collector of an NPN transistor Q2.

The connection point of the collector of the PNP transistor Q1 and the collector of the NPN transistor Q2 is connected with the cathode of a diode $D_2$ and the anode of the $D_2$ is connected with the emitter of the NPN transistor Q2. The connection point of the anode of the diode $D_2$ and the emitter of the NPN transistor Q2 is grounded as well as connected with one end of a resistance $R_{22}$. The other end of the resistance $R_{22}$ is connected with the base of the NPN transistor Q2. The connection point of the resistance $R_{22}$ and the base of the NPN transistor Q2 is connected with one end of a resistance $R_{21}$, and the other end of the resistance $R_{21}$ is connected with the connection point of the resistance $R_{11}$ and the output of NAND Gate 12.

A circuit consisting of a PNP transistor Q3, an NPN transistor Q4, diodes $D_3$ and $D_4$, resistances $R_{31}$, $R_{32}$, $R_{41}$ and $R_{42}$ is the same as the above mentioned circuit which consists of the PNP transistor Q1, the NPN transistor Q2, the diodes $D_1$ and $D_2$, the resistances $R_{11}$, $R_{12}$, $R_{21}$ and $R_{22}$ except that both an end of the resistance $R_{31}$ which is not connected with the base of the PNP transistor Q3 and an end of the resistance $R_{41}$ which is not connected with the base of the NPN transistor Q4 are connected with the output terminal of the NAND Gate 13.

The connection point of the collector of the PNP transistor Q1 and the collector of the NPN transistor Q2 is connected with one terminal of the motor 4, while the other terminal of the motor 4 is connected with the connection point of the collector of the PNP transistor Q3 and the collector of the NPN transistor Q4.

Hereinafter, in this specification, we will refer to said transistors just as 'transistor Q1', 'transistor Q2', 'transistor Q3' and 'transistor Q4', respectively.

When the PWM pulse is at a low level, the outputs of the NAND Gates 12 and 13 are at high levels regardless of the level of the direction pulse, and said high level outputs are applied to the bases of the transistors Q1 to Q4. In this case, the transistors Q1 and Q3 are turned off, while the transistors Q2 and Q4 are turned on so that the motor 4 is not energized but in the short brake state.

On the other hand, in case the PWM pulse is at a high level, and if the direction pulse is at a low level, the output of the NAND gate 12 is at a low level and the output of the NAND gate 13 is at a high level. That is, the low level output is applied to the bases of the transistors Q1 and Q2, while the high level output is applied to the bases of the transistors Q3 and Q4. In this case, the transistors Q2 and Q3 are turned off, while the transistors Q1 and Q4 are turned on so that a current is applied, as indicated by the arrow Y in FIG. 2, to the motor 4 and the motor rotates in a direction (we may call it the forward direction).

When the PWM pulse is at a high level, and the direction pulse is at a high level, the output of the NAND gate 12 is at a high level and the output of the NAND gate 13 is at a low level. That is, the high level output is applied to the bases of the transistors Q1 and Q2, while the low level output is applied to the bases of the transistors Q3 and Q4. In this case, the transistors Q1 and Q4 are turned off, while the transistors Q2 and Q3 are turned on so that a current in the direction reverse to the arrow Y is applied to the motor 4 and the motor 4 rotates in the opposite direction, that is reversely.

As described above, the motor drive circuit 3 controls the speed of the motor 4 by applying a current to the motor 4 according to the duty of the PWM pulse. More specifically, the current is being applied to the motor 4 while the PWM pulse remains at a high level in order to control the speed of the motor 4. In this case, if the direction pulse is at a low level, the motor 4 rotates forward, and if the direction pulse is at a high level, the motor 4 rotates reversely. The truth table given below shows the relation between the levels of the PWM and direction pulses and the states of the drive (rotation) of the motor 4.

TABLE

| Input (level) | | Driving state |
| --- | --- | --- |
| PWM pulse | Direction pulse | of motor 4 |
| Low | Don't care | Short Brake |
| High | Low | Forward Rotation |
| High | High | Reverse Rotation |

The motor 4 (in FIG. 1) whose rotation is controlled by the motor drive circuit 3 moves (drives) the correcting lens 8 in the direction perpendicular to the optical axis (that is, in the plane including the arrow X in FIG. 1 and perpendicular to the drawing plane).

Incidentally, the rotary motion of the motor 4 is converted into a linear motion by a gear (not shown) and the resultant linear motion is transmitted to the correcting lens 8.

Figure 4:
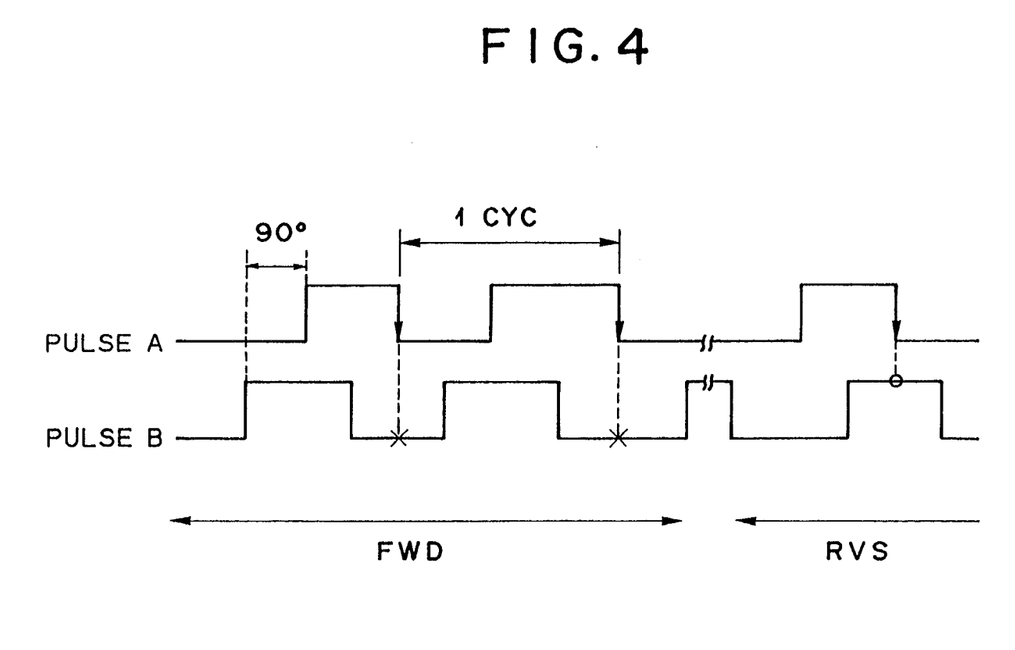
FIG. 4 is a waveform illustration of a pulse A and a pulse B output from a lens position detection circuit of the embodiment shown in FIG. 1.

The lens position detection circuit 5 employs, for example, what is called a transmission type encoder, and applies a pulse A and a pulse B for detecting the position, the moving speed and the moving direction of the correcting lens 8 to the CPU 1. More specifically, in an example of the lens position detection circuit 5, a gear for converting the rotary motion of the motor 4 into the linear motion is provided A disk (not shown) on which a plurality of holes are formed on the same radius at the same intervals is attached to the gear. A pair of interrupters (not shown) for detecting said holes on the disk is arranged so that the results of detection by respective interrupters are an output with a phase difference of, for example, about 90°. Accordingly, when the motor 4 is rotating forward, the lens position detection circuit 5 applies the pulse A and the pulse B which has a phase lag of about 90° with respect to the pulse A to the CPU 1 (FIG. 4). When the motor 4 is rotating reversely, the lens position detection circuit 5 applies the pulse A and the pulse B whose phase shifts forward by about 90° with respect to that of the pulse A to the CPU 1 (FIG. 4).

The CPU 1 calculates the moving speed of the correcting lens 8 (that is, the rotating speed of the motor 4) on the basis of the cycle either of the pulse A or of pulse B. For example, the moving direction of the correcting lens 8 (that is, the direction of rotation of the motor 4) is Judged from the level of one of the pulses at the time of the trailing (or leading) edge of the other pulse. And the position of the correcting lens 8 (that is, the number of revolutions of the motor 8) is calculated by counting the trailing edges (or leading edges) of the pulse A (or B).

The operations of this embodiment will be described with reference to the flowchart in FIG. 5. In step S1, when the main switch SW1 (FIG. 1) is turned on, variables $L_R$, $L_C$, $V_C$, $V_R$ and $\Delta L$ are all reset as 0. In step S2, the CPU 1 applies the PWM pulse whose duty is 0% to the motor drive circuit 3 to put the motor 4 in the short brake state. Then, the operations proceed to step S3.

In step S3, whether the release switch SW2 is turned on or off is judged. If the release switch SW2 is judged to be turned off, the operations proceed to step S12. If the release switch SW2 is judged to be turned on in step S3, the operation proceeds to step S4, in which the clock operation is started by a timer (not shown) for measuring the cycle of the pulse A (or B) and which counts time in a cycle sufficiently shorter than that of the pulse A (or B) output from the lens position detection circuit 5. Then the operations proceed to step S5.

Figure 6:
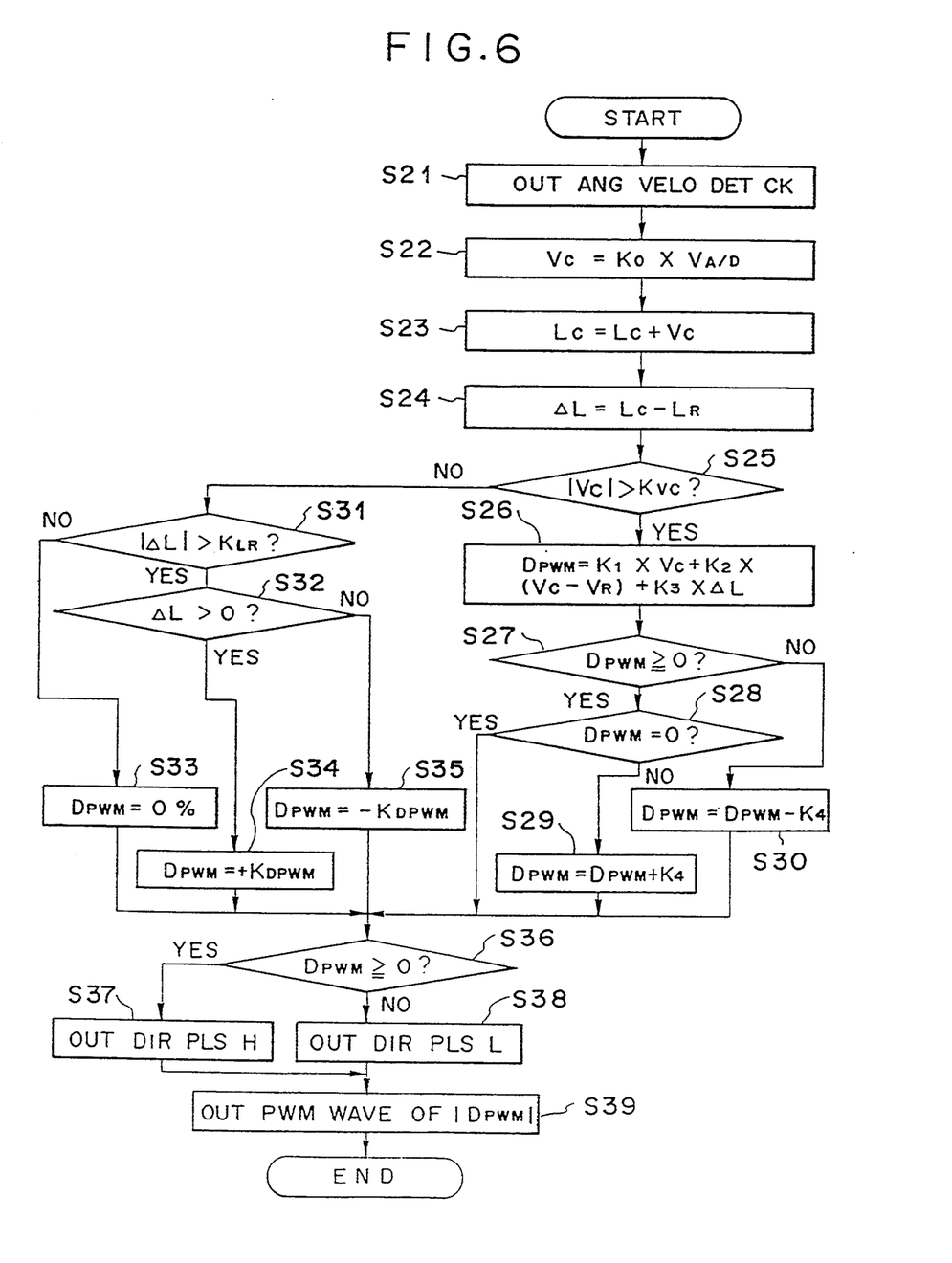
FIG. 6 is a flowchart for explaining an interruption processing steps allowed in step 5 in FIG. 5.

In step S5, interruption processing steps S21 to S39 shown in FIG. 6 are allowed. These interruption processing steps are carried out, for example, every one millisecond.

More specifically, in step S21 shown in FIG. 6, the angular velocity of the camera shake which is detected by the angular velocity detection circuit 3 and is subjected to A/D conversion is substituted for the variable $V_{A/D}$. Then, in step S22, the target velocity $V_C$ at which the correcting lens 8 is moved is calculated, for example, according to the following equation:

$$V_C = K_O \times V_{A/D},$$

where in $K_O$ is a predetermined constant for converting the variable $V_{A/D}$ (the angular velocity of the camera shake) into the target velocity $V_C$ at which the correcting lens 8 is moved. When the correcting lens 8 is moved at the velocity $V_C$, the target velocity $V_C$ of the correcting lens 8 is expressed as the number of pulses (either A or B) output from the lens position detection circuit 5 per cycle in which the interruption processing steps S21 to S39 are carried out: that is, per 1 ms. Accordingly, the dimension of the velocity $V_C$ is (the number of pulses/ms).

Therefore, the dimension of the target position $L_C$ is (the number of pulses).

In step S24, the error (difference) $\Delta L$ between the current position $L_M$ of the correcting lens 8 obtained in the interruption processing steps S41 to S49 (described later) (see FIG. 7) and the target position $L_C$ of the correcting lens 8 calculated in step S23 is calculated on the basis of the pulse A and the pulse B outputs from the lens position detection circuit 5. Then, in step S25, whether the absolute value $|V_C|$ of the target velocity $V_C$ of the correcting lens 8 is greater than a predetermined value $K_{VC}$ (>0, a predetermined velocity) or not is judged.

When the absolute value $|V_C|$ of the target velocity $V_C$ of the correcting lens 8 is judged not to be greater than said predetermined value (predetermined velocity) $K_{VC}$ in step S25, that is, when the connecting lens 8 is being moved at a low speed, the operation proceeds to step S31, where whether the absolute value $|\Delta L|$ of the difference $\Delta L$ between the target position $L_C$ of the correcting lens 8 and the current position $L_R$ of the correcting lens 8 is greater than a predetermined value $K_{LR}$ or not is judged.

When the absolute value $|\Delta L|$ of the difference $\Delta L$ between the target position $L_C$ of the correcting lens 8 and the current position $L_R$ of the correcting lens 8 is judged not to be greater than the predetermined value $K_{LR}$ (>0) in step S31, the operations proceed to step S33, where the variable $D_{PWM}$ indicating the duty of the PWM pulse is set to be 0, and further to step S36.

Note that if $D_{PWM} > 0$, the motor 4 rotates reversely, and that if $D_{PWM} < 0$, the motor 4 rotates forward.

When the absolute value $|\Delta L|$ of the difference $\Delta L$ between the target position $L_C$ of the correcting lens 8 and the current position $L_R$ of the correcting lens 8 is judged to be greater than the predetermined value $K_{LR}$, the operations proceed to step S32, where whether the difference $\Delta L$ between the target position $L_C$ of the correcting lens 8 and the current position $L_R$ of the correcting lens 8 is greater than 0 or not is judged.

If the difference $\Delta L$ between the target position $L_C$ of the correcting lens 8 and the current position $L_R$ thereof is judged to be a positive value, in step S32 the operations proceed to step S34, where a predetermined value $K_{DPWM}$ (>0) is set as the variable $D_{PWM}$ indicating the duty of the PWM pulse, and further to step S36. If the difference $\Delta L$ between the target position $L_C$ of the correcting lens 8 and the current position $L_R$ thereof, is judged not to be a positive value in step S32, the operations proceed to step S35, where a predetermined value $-K_{DPWM}$ (<0) is set as the variable $D_{PWM}$ indicating the duty of the PWM pulse, and further to step S36.

If, at step S25, the absolute value $|V_C|$ of the target velocity $V_C$ of the correcting lens 8 is judged to be greater than the predetermined value (predetermined velocity) $K_{VC}$, that is, if the correcting lens 8 is being moved at a medium or high speed, the operations proceed to step S26, where the variable $D_{PWM}$ indicating the duty of the PWM pulse is calculated, for example, according to the following equation:

$$D_{PWM} = K_1 \times V_C + K_2 \times (V_C - V_R) + K_3 \times \Delta L \qquad (1)$$

wherein $K_1$, $K_2$ and $K_3$ are positive constants determined, for example, by the time constants of the motor 4, the correcting lens 8, and the machine parts including a gear, and the like for converting rotary motion of the motor 4 into linear motion and transmitting it to the correcting lens 8.

After the processing in step S26, in step S27, whether the variable $D_{PWM}$ indicating the duty of the PWM pulse, which is calculated according to the equation (1), is greater than 0 or not is judged. If the variable $D_{PWM}$ is judged to be less than 0 in step S27, the operations proceed to step S30, where a predetermined value $K_4$ (>0) is subtracted from the variable $D_{PWM}$ indicating the duty of the PWM pulse calculated in step S26, and further to step S36. If the variable $D_{PWM}$ is judged to or more than be equal to 0 in step S27, the operations proceed to step S28, where whether the variable $D_{PWM}$ indicating the duty of the PWM pulse calculated in step S26 is 0 or not is judged.

When the variable indicating the duty of the PWM pulse calculated in step S26 is judged to be 0 in step S28, the operations skip over step S29 and proceed to step S36. When the variable $D_{PWM}$ indicating the duty of the PWM pulse calculated in step S26 is judged not to be 0, the operations proceed to step S29, where the predetermined value $K_4$ (>0) is added to $D_{PWM}$ indicating the duty of the PWM pulse calculated in step S26, and further to step S36.

Incidentally, said predetermined value $K_4$ is equal to D7 shown in FIG. 3: in other words, the X-intercept of the line D3-D4.

The variable $D_{PWM}$ for indicating the duty of the PWM pulse, which is calculated in step S26 and is subjected to either the operation of step S29 or the operation of step S30, or which is set in one of steps S33, S34 and S35, is judged in step S36. When the variable $D_{PWM}$ indicating the duty of the PWM pulse is judged to be equal to 0 or more, the operations proceed to step S37, where the CPU 1 applies the direction pulse at a high level to the motor drive circuit 3 to rotate the motor 4 reversely, and further to step S39.

When the variable $|D_{PWM}|$ indicating the duty of the PWM pulse is judged to be less than 0 in step S36, the operations proceed to step S38, where the CPU 1 applies the direction pulse at a low level to the motor drive circuit 3 to rotate the motor 4 forwards, and further to step S39.

In step S39, the CPU 1 applies the PWM pulse, whose duty is indicated by the absolute value $|D_{PWM}|$ of the variable $D_{PWM}$ which is calculated in step S26 and is subjected to either the operation of step S29 or the operation of step S30 or which is set in one of steps S33, S34 and S35, to the motor drive circuit 3, when the operations are finished.

As described above, since the operations include the interruption processing steps S21 to S39, the calculation of the duty of the PWM pulse for controlling the rotating speed of the motor when the motor 4 drives the correcting lens 8 at a low speed is different from the calculation of the same when the motor 4 drives the correcting lens 8 at a medium or high speed. In addition, in case that the correcting lens 8 is moved at a low speed, the motor 4 is rotated by the PWM pulse whose duty is the predetermined value $K_{DPWM}$ when the difference $\Delta L$ between the target position (destination) of the correcting lens 8 and the current position thereof. When the difference $\Delta L$ of the target position (destination) of the correcting lens 8 and the current position thereof becomes small, the duty of the PWM pulse is made to be 0% in order to stop the motor 4 (in the short brake state). As the motor 4 is intermittently driven as described above, stable control of the speed of the correcting lens 8 (the motor 4) can be performed.

Incidentally, in case that the motor 4 drives the correcting lens 8 at a medium or high speed, the calculations of the variable $D_{PWM}$ indicating the duty of the PWM pulse are not limited to those in steps S26, S29 and S30 described above.

Figure 5:
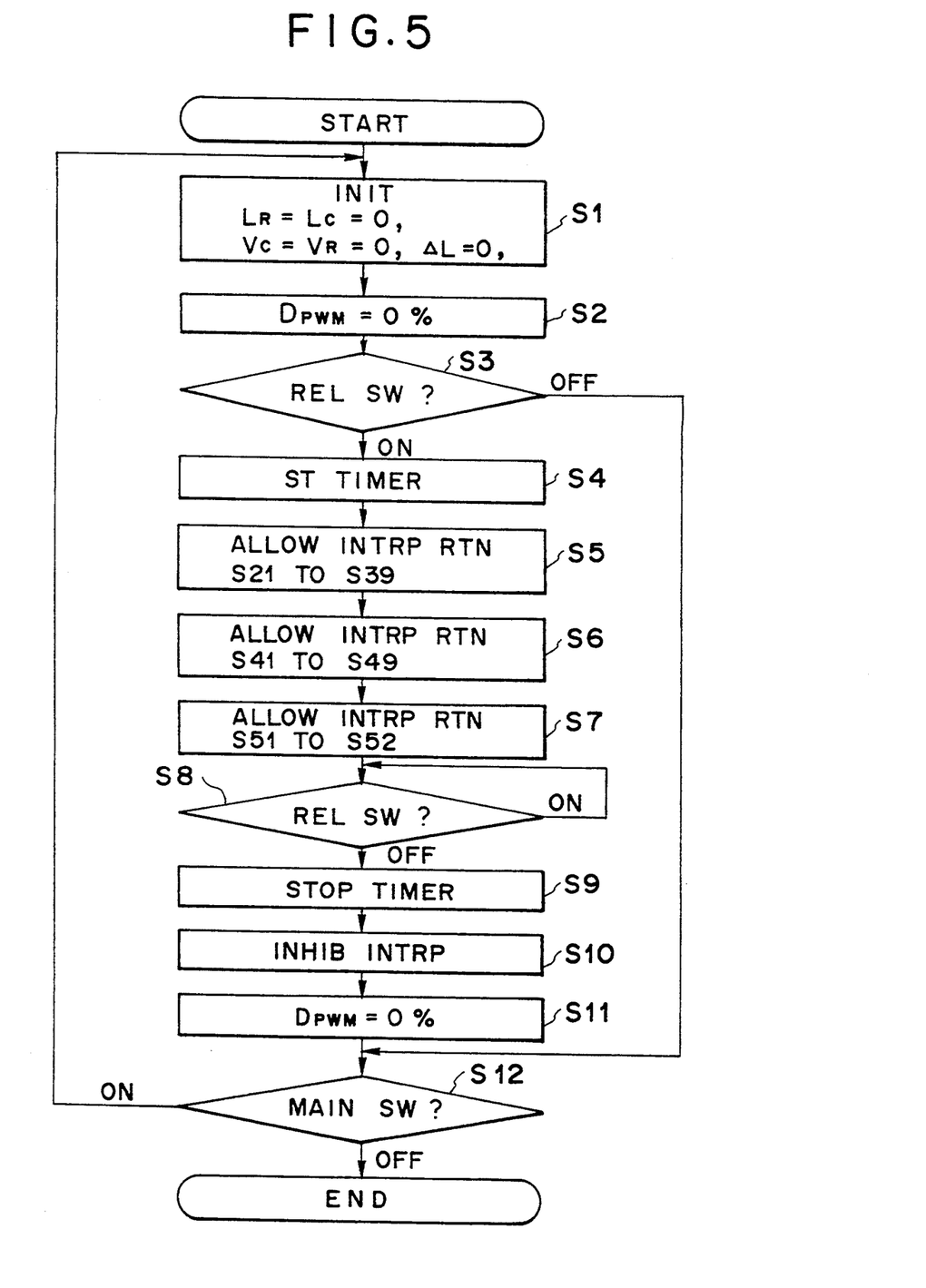
FIG. 5 is a flowchart explaining operations of the embodiment shown in FIG. 1.
Figure 7:
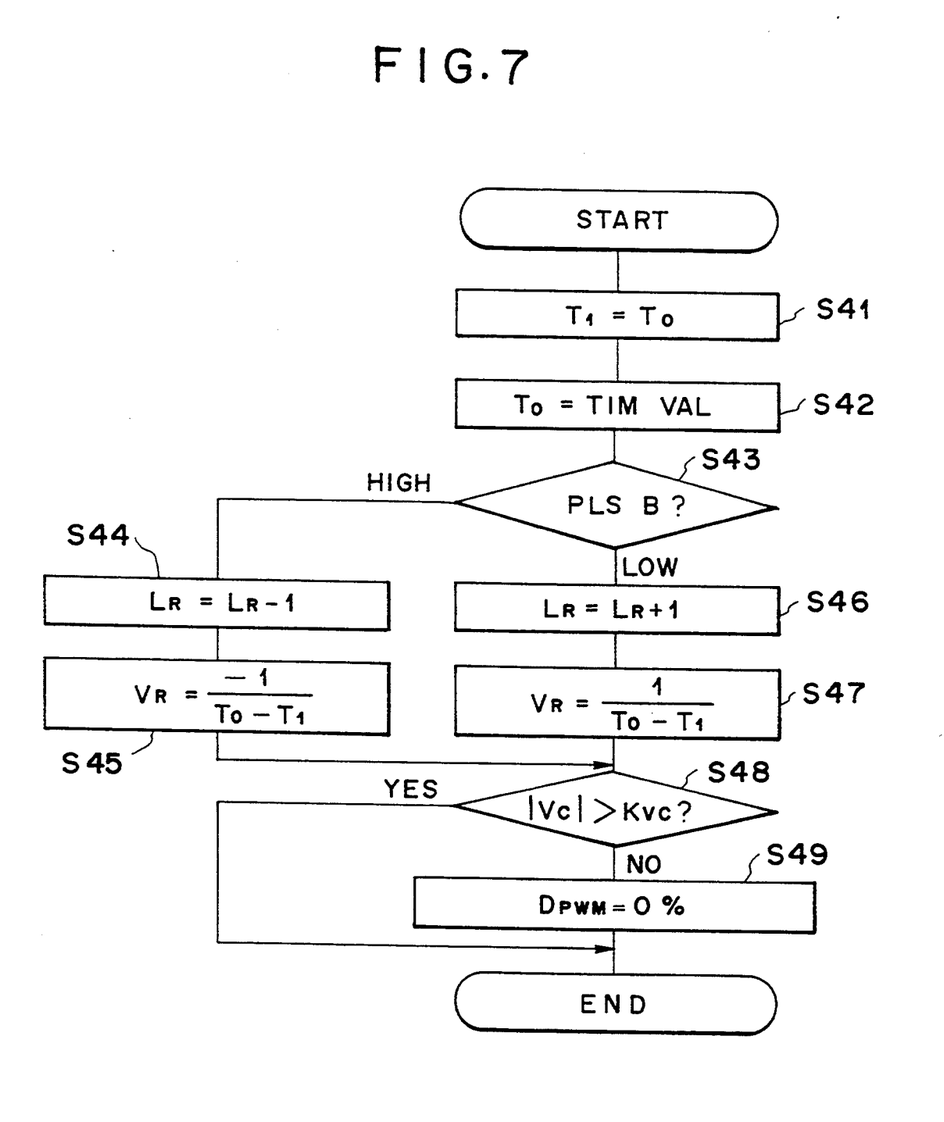
FIG. 7 is a flowchart for explaining an interruption processing steps allowed in step 6 in FIG. 5.

After the above-mentioned interruption processing steps S21 to S39 (see FIG. 6) are allowed in step S5 in FIG. 5, the operations proceed to step S6 (FIG. 5), where the interruption processing steps S41 to S49 shown in FIG. 7 are allowed. There interruption processing steps are executed by the lens position detection circuit 5. For example, everytime the trailing edge of the pulse A is detected by the CPU 1, the interruption processing steps are executed.

More specifically, in step S41 in FIG. 7, the previous value (of the clock operation by the timer), which was set as a variable $T_0$ last time in this interruption processing step, is substituted for a variable $T_1$. Thus, the operations proceed to step S42, where the value of the clock operation by the timer which was started in step S4 in FIG. 5 is set as the variable $T_0$. Next, in step S43, the level of the pulse B (or A) output from the lens position detection circuit 5 is judged to be high or low.

Since the interruption processing steps S41 to S49 shown in FIG. 7 are executed everytime the trailing edge of the pulse A output from the lens position detection circuit 5 is detected by the CPU 1, as described above, the pulse B is at a low level (indicated by 'x' in FIG. 4) if the motor 4 rotates forward. If the motor 4 rotates reversely, the pulse B is at a high level (indicated by '0' in FIG. 4).

When the pulse B output from the lens position detection circuit 5 is judged to be at a high level in step S43, that is, when the motor 4 rotates reversely, the operations proceed to step S44, where the variable $L_R$ indicating the current position of the correcting lens 8 is decreased by 1 (by one pulse), and further to step S45.

As the position of the correcting lens 8 is expressed by the number of pulses of the pulse A output from the lens position detection circuit 5, as described above, the current position of the correcting lens 8 can be obtained by increasing or decreasing by one pulse, which depends on the direction of rotation of the motor 4, the variable $L_R$ for indicating the current position of the correcting lens 8 which was obtained during the previous interruption processing steps.

In step S45, the moving speed $V_R$ of the correcting lens 8 is calculated, which is the inverse number of the cycle $(T_0-T_1)$ in which these interruption processing steps are executed, that is, the inverse of the cycle (time per pulse) of the pulse A output from the lens position detection circuit 5, with a negative sign indicating reverse rotation of the motor 4. Then, the operations proceed to step S48.

On the other hand, when the pulse B output from the lens position detection circuit 5 is judged to be at a low level in step S43, that is, when the motor 4 rotates forward, the operations proceed to step S46, where the variable $L_R$ indicating the current position of the correcting lens 8 is increased by 1 (by one pulse), and further to step S47.

In step S47, the moving speed $V_R$ of the correcting lens 8 is calculated, which is the inverse number of the cycle $(T_0-T_1)$ in which these interruption processing steps are executed, that is the inverse of the cycle (time per pulse) of the pulse A output from the lens position detection circuit 5, with a positive sign indicating forward rotation of the motor 4. Then, the operations proceed to step S48.

In step S48, in the same way as the step S25 in FIG. 6, whether the absolute value $|V_C|$ of the target velocity $V_C$ of the correcting lens 8 is greater than the predetermined value (predetermined velocity) $K_{VC}$ or not is judged. If the absolute value $|V_C|$ of the target velocity $V_C$ of the correcting lens 8 is judged to be greater than said predetermined value (predetermined velocity) $K_{VC}$, the operations skip over step S49 and the operations are finished.

When the absolute value $|V_C|$ of the target velocity $V_C$ of the correcting lens 8 is judged not to be greater than the predetermined value (predetermined velocity) $K_{VC}$ in step S48, the operations proceed to step S49, where the CPU 1 applies the PWM pulse whose duty is 0% to the motor drive circuit 3, thereby finishing the operations.

As described above, during the interruption processing steps S41 to S49, whether the motor 4 drives the correcting lens 8 at a low speed or at a medium or high level is judged everytime the trailing edge of the pulse A output from the lens position detection circuit 5 is detected by the CPU 1. If the correcting lens 8 is judged to be moved at a low speed, the duty of the PWM pulse is made to be 0% in order to put the motor 4 in the short brake state. That is, as the motor 4 is intermittently driven, stable control of the speed of the correcting lens 8 (the motor 4) can be performed.

After the above-mentioned interruption processing steps S41 to S49 (see FIG. 7) are allowed in step S6 in FIG. 5, the operations proceed to step S7 (FIG. 5), where the interruption processing steps S51 and S52 are allowed. These interruption processing steps are executed by the lens position detection circuit 5. For example, every time the leading edge of the pulse A is detected by the CPU 1, these interruption processing steps are executed.

Figure 8:
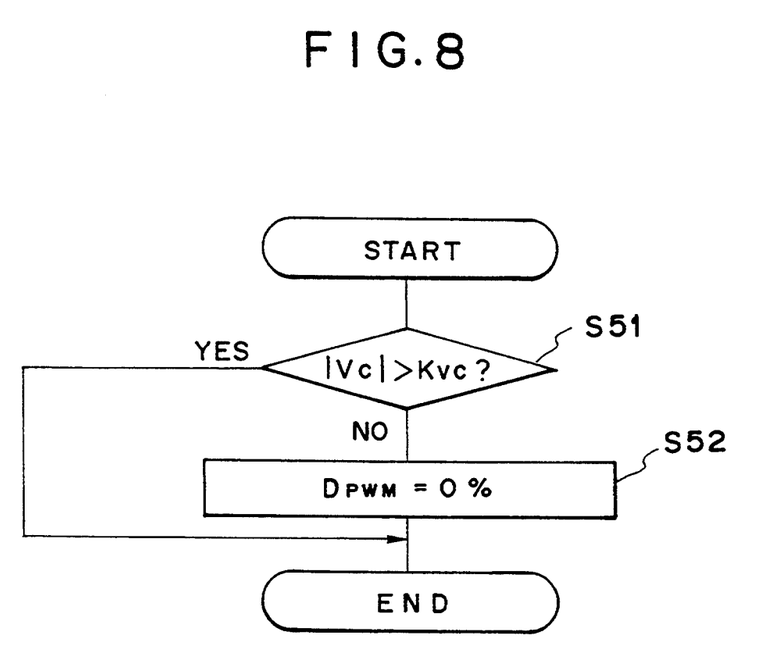
FIG. 8 is a flowchart for explaining an interruption processing steps allowed in step 7 in FIG. 5.

More specifically, in step S51 in FIG. 8, in the same way as step S25 in FIG. 6, whether the absolute value $|V_C|$ of the target velocity $V_C$ of the correcting lens 8 is greater than the predetermined value (predetermined velocity) $K_{VC}$ or not is judged. If the absolute value $|V_C|$ of be target velocity $V_C$ of the correcting lens 8 is judged to the greater than the predetermined value (predetermined velocity) $K_{VC}$, the operations skip over step S52, and are finished.

If the absolute value $|V_C|$ of the target velocity $V_C$ of the correcting lens 8 is judged not to be greater than the predetermined value (predetermined velocity) $K_{VC}$ in step S51, the operations proceed to step S52, where the CPU 1 applies the PWM pulse whose duty is 0% to the motor drive circuit 3, thereby finishing the operations.

As described above, in the interruption processing steps S51 and S52, whether the motor 4 drives the correcting lens 8 at a low speed or at a medium or high speed is judged everytime the leading edge of the pulse A output from the lens position detection circuit 5 is detected by the CPU 1. When the correcting lens 8 is judged to be moved at a low speed, the duty of the PWM pulse is made to be 0% in order to stop the motor 4 (in the short brake state), that is, the motor 4 is intermittently driven. Accordingly, more stable control of the speed of the correcting lens 8 (motor 4) can be performed.

After the above-mentioned interruption processing steps S51 and S52 are allowed in step S7 in FIG. 5, the operations proceed to step S8 (FIG. 5), where whether the release switch SW2 is turned on or not is judged. If the release switch SW2 is judged to be turned on in step S8, step S8 is repeated. And when the release switch SW2 is judged to be turned off, the operations proceed to step S9, where the clock operation started in step S4 is stopped, and further to step S10.

In step S10, all the interruption processing steps allowed in steps S5, S6 and S7 are inhibited. In step S11, the CPU 1 applies the PWM pulse whose duty is 0% to the motor drive circuit 3 to stop the motor 4 in the short brake state. In step S12, whether the main switch SW1 is turned on or not is judged. If the main switch SW1 is judged to be turned on, the operations return to step S1. When the main switch SW1 is judged to be turned off in step S12, the operations are finished.

In the above description, the apparatus according to the present invention for correcting the camera shake is applied to a phototaking camera. However the present invention can be applied not only to such cameras but also video cameras for shooting an animated film, for example.

Further, though in the above embodiment the motor 4 can be put in the short brake state at timing corresponding to both the trailing edges and the leading edges of the pulse A, the motor 4 can be put into the short brake state at timing corresponding to either the trailing edges of the pulse A or the leading edges thereof, as well as at timing corresponding to the trailing edges and/or the leading edges of the pulse B.

In addition, in the above description, the variable $D_{PWM}$ indicating the duty of the PWM pulse is set to be the predetermined value $K_{DPWM}$ or $-K_{DPWM}$ in step S34 or step S35 in FIG. 6 in case the difference $\Delta L$ of the target position (destination) of the correcting lens 8 driven at a low speed and the current position thereof is great. But, the variable $D_{PWM}$ can be calculated, for example, according to the following equation:

$$D_{PWM} = K_{DPWM} \times \Delta L$$

As described above, according to the apparatus of the present invention for correcting the camera shake, the target driving speed of the correction means is calculated on the basis of the camera shake detected by the means for detecting the camera shake. And the target position of the correction means is calculated on the basis of the resultant target driving speed. At the same time, the current position of the correction means is detected in order to calculate the difference between the target position of the correction means and the current position thereof. The control means intermittently drives the driving means according to the target driving speed of the correction means or the difference between the target position and the current position of the correction means. Therefore, a stable speed control can be performed not only when the driving means drives the correction means at a medium or high speed but also when the driving means drives the correction means at a low speed, thereby reducing the error of correction of the camera shake executed by the correction means.

What is claimed is:

1. An apparatus for correcting shake, comprising:
    angular velocity detecting means for detecting an angular velocity caused by a shake;
    shake-correction means for correcting the shake by driving a DC motor to move a correction lens which is at least a part of a photographing lens system;
    target velocity calculation means for calculating a target velocity of said correction lens based on an output from said angular velocity detecting means;
    determining means for determining whether the calculated target velocity is less than a predetermined value; and
    lens position detecting means for detecting a position of said correction lens;
    wherein when said determining means determines that the calculated target velocity is less than said predetermined value, said shake-correction means drives said DC motor with a prescribed input signal and then discontinues said prescribed input signal in response to a change in the output from said lens position detecting means.

2. An apparatus according to claim 1, wherein said prescribed input signal is a pulse width modulated signal.

3. An apparatus according to claim 2, wherein said shake-correction means causes said DC motor to be placed in a short brake state when said prescribed input signal is discontinued.

4. An apparatus according to claim 1, wherein said shake-correction means sets an input voltage of said DC motor to zero when said prescribed input signal is discontinued.

5. An apparatus for correcting shake, comprising:
    angular velocity detecting means for detecting an angular velocity caused by a shake;
    shake-correction means for correcting the shake by driving a DC motor to move a correction lens which is at least a part of a photographing lens system;
    target velocity calculation means for calculating a target velocity of said correction lens based on an output from said angular velocity detecting means;
    target position calculation means for calculating a target position of said correction lens based on an output from said target velocity calculation means;
    lens position detecting means for detecting a position of said correction lens;
    control error calculation means for calculating a control error of a position of said correction lens based on an output from said target position calculation means and an output from said lens position detecting means; and
    determining means for determining whether the calculated target velocity is less than a first predetermined value and whether the calculated control error is greater than a second predetermined value;

wherein when said determining means determines that the calculated target velocity is less than said first predetermined value and the calculated control error is greater than said second predetermined value, said shake-correction means drives said DC motor with a prescribed input signal and then discontinues said prescribed input signal in response to a change in the output from said lens position detecting means.

6. An apparatus according to claim 5, wherein said prescribed input signal is a pulse width modulated signal.

7. An apparatus according to claim 6, wherein said shake-correction means causes said DC motor to be placed in a short brake state when said prescribed input signal is discontinued.

8. An apparatus according to claim 5, wherein said shake-correction means sets an input voltage of said DC motor to zero when said prescribed input signal is discontinued.

9. An apparatus for correcting shake, comprising:
an angular velocity detector for detecting an angular velocity caused by a shake;
a shake-correction circuit for correcting the shake by driving a DC motor to move a correction lens which is at least a part of a photographing lens system;
a calculation circuit for calculating a target velocity of said correction lens based on an output from said angular velocity detector;
a determination circuit for determining whether the calculated target velocity is less than a predetermined value; and
a lens position detector for detecting a position of said correction lens;
wherein when said determining circuit determines that the calculated target velocity is less than said predetermined value, said shake-correction circuit drives said DC motor with a prescribed input signal and then discontinues said prescribed input signal in response to a change in the output from said lens position detector.

10. An apparatus according to claim 9, wherein said prescribed input signal is a pulse width modulated signal.

11. An apparatus according to claim 10, wherein said shake-correction circuit causes said DC motor to be placed in a short brake state when said prescribed input signal is discontinued.

12. An apparatus according to claim 9, wherein said shake-correction circuit sets an input voltage of said DC motor to zero when said prescribed input signal is discontinued.

13. An apparatus for correcting shake, comprising:
an angular velocity detector for detecting an angular velocity caused by a shake;
a shake-correction circuit for correcting the shake by driving a DC motor to move a correction lens which is at least a part of photographing lens system;
a target velocity calculation circuit for calculating a target velocity of said correction lens based on an output from said angular velocity detector;
a target position calculation circuit for calculating a target position of said correction lens based on an output from said target velocity calculation circuit;
a lens position detector for detecting a position of said correction lens;
a control error calculation circuit for calculating a control error of a position of said correction lens based on an output from said target position calculation circuit and an output from said lens position detector;
a determining circuit for determining whether the calculated target velocity is less than a first predetermined value; and
a determining circuit for determining whether the calculated control error is greater than a second predetermined value;
wherein when it is determined that the calculated target velocity is less than said first predetermined value and the calculated control error is greater than said second predetermined value, said shake-correction circuit drives said DC motor with a prescribed input signal and then discontinues said prescribed input signal in response to a change in the output from said lens position detector.

14. An apparatus according to claim 13, wherein said prescribed input signal is a pulse width modulated signal.

15. An apparatus according to claim 14, wherein said shake-correction circuit causes said DC motor to be placed in a short brake state when said prescribed input signal is discontinued.

16. An apparatus according to claim 13, wherein said shake-correction circuit sets an input voltage of said DC motor to zero when said prescribed input signal is discontinued.

17. An apparatus for correcting shake, comprising:
angular velocity detecting means for detecting an angular velocity caused by a shake;
shake-correction means for correcting the shake by driving a DC motor to move a correction lens which is at least a part of a photographing lens system;
target velocity calculation means for calculating a target velocity of said correction lens based on an output from said angular velocity detecting means;
discriminating means for discriminating a low speed condition based on target velocity calculation results of said target velocity calculation means; and
lens position detecting means for detecting a position of said correction lens;
wherein in said low speed condition, said shake-correction means controls said motor by driving said motor with a prescribed input signal, and intermittently discontinuing said prescribed input signal in response to changes in the output from said lens position detecting means.

18. An apparatus according to claim 17, wherein said prescribed input signal is a pulse width modulated signal.

19. An apparatus according to claim 18, wherein said shake-correction means causes said DC motor to be placed in a short brake state when said prescribed input signal is discontinued.

20. An apparatus according to claim 17, wherein said shake-correction means sets an input voltage of said DC motor to zero when said prescribed input signal is discontinued.

* * * * *